US012075540B2

United States Patent
Kalkschmidt et al.

(10) Patent No.: US 12,075,540 B2
(45) Date of Patent: Aug. 27, 2024

(54) OPERATING AN LED MATRIX WHERE POWER SUPPLY VOLTAGE IS LESS THAN TOTAL FORWARD VOLTAGE OF LEDS

(71) Applicant: LUMILEDS LLC, San Jose, CA (US)

(72) Inventors: Christian Kalkschmidt, Aachen (DE); Udo Karbowski, Aachen (DE)

(73) Assignee: LUMILEDS, LLC, San Jose, CA (US)

(*) Notice: Subject to any disclaimer, the term of this patent is extended or adjusted under 35 U.S.C. 154(b) by 105 days.

(21) Appl. No.: 17/925,566

(22) PCT Filed: May 17, 2021

(86) PCT No.: PCT/US2021/032791
§ 371 (c)(1),
(2) Date: Nov. 15, 2022

(87) PCT Pub. No.: WO2021/232017
PCT Pub. Date: Nov. 18, 2021

(65) Prior Publication Data
US 2023/0199930 A1    Jun. 22, 2023

Related U.S. Application Data

(60) Provisional application No. 63/025,638, filed on May 15, 2020.

(30) Foreign Application Priority Data

Jul. 22, 2020 (EP) .................................. 20187189

(51) Int. Cl.
*H05B 45/30* (2020.01)
*H05B 45/325* (2020.01)
*H05B 45/48* (2020.01)

(52) U.S. Cl.
CPC .......... *H05B 45/48* (2020.01); *H05B 45/325* (2020.01)

(58) Field of Classification Search
CPC ........ H05B 45/10; H05B 45/30; H05B 45/32; H05B 45/325; H05B 45/48; H05B 47/10
See application file for complete search history.

(56) References Cited

U.S. PATENT DOCUMENTS

| 7,649,326 B2 | 1/2010 | Johnson et al. |
| 2014/0361696 A1* | 12/2014 | Siessegger ........... H05B 45/395 315/193 |

(Continued)

FOREIGN PATENT DOCUMENTS

| JP | 2019-117752 A | 7/2019 |
| KR | 2012-0078999 A | 7/2012 |

(Continued)

OTHER PUBLICATIONS

Extended European Search Report dated Dec. 11, 2020 for European Patent Application No. 20187189.4.

(Continued)

*Primary Examiner* — Jimmy T Vu
(74) *Attorney, Agent, or Firm* — Volpe Koenig

(57) ABSTRACT

A lighting unit includes a power supply that provides a maximum voltage and multiple LED lighting circuits. Each of the LED lighting circuits includes an LED string, multiple switches, a switching sequencer and a switch controller. The LED string includes multiple series-connected emitters having a total forward voltage that exceeds the maximum voltage of the power supply. Each of the switches is coupled in parallel with a respective LED of the LED string. The switching sequencer provides a sequence of switching patterns such that a total forward voltage of simultaneously active LEDs in each switching pattern does not exceed the maximum voltage of the power supply. The switch control- (Continued)

ler actuates switches according to each of the switching patterns in the sequence. The LED string of each of the plurality of LED lighting circuits is arranged in a two-dimensional array.

20 Claims, 8 Drawing Sheets

(56) References Cited

U.S. PATENT DOCUMENTS

2017/0282786 A1  10/2017  Toda et al.
2019/0086065 A1   3/2019  Hirose

FOREIGN PATENT DOCUMENTS

KR   2015-0143236 A   12/2015
KR   2018-0121378 A   11/2018

OTHER PUBLICATIONS

International Preliminary Report on Patentability Chapter I issued Nov. 15, 2022 for PCT International Application No. PCT/US2021/032791.

International Search Report and Written Opinion mailed Sep. 6, 2021 for PCT International Application No. PCT/US2021/032791.

* cited by examiner

US 12,075,540 B2

OPERATING AN LED MATRIX WHERE POWER SUPPLY VOLTAGE IS LESS THAN TOTAL FORWARD VOLTAGE OF LEDS

CROSS REFERENCE TO RELATED APPLICATIONS

This application is a § 371 application of International Application No. PCT/US2021/032791, filed May 17, 2021, which claims the benefit of U.S. Provisional Patent Application No. 63/025,638, which was filed on May 15, 2020, and European Patent Application Number 20187189.4, which was filed on Jul. 22, 2020, the contents of which are hereby incorporated by reference herein.

BACKGROUND

In a light-emitting diode (LED) lighting circuit, a direct current (DC) power supply can be used to drive a string of series-connected LEDs. The power supply may be realized as a current source to provide a desired current. The voltage of the power supply may be adjusted to the total forward voltage of the LEDs of the string. In other words, the power supply or current source may drive all LEDs simultaneously.

SUMMARY

A lighting unit includes a power supply that provides a maximum voltage and multiple LED lighting circuits. Each of the LED lighting circuits includes an LED string, multiple switches, a switching sequencer and a switch controller. The LED string includes multiple series-connected emitters having a total forward voltage that exceed the maximum voltage of the power supply. Each of the switches is coupled in parallel with a respective LED of the LED string. The switching sequencer provides a sequence of switching patterns such that a total forward voltage of simultaneously active LEDs in each switching pattern does not exceed the maximum voltage of the power supply. The switch controller actuates switches according to each of the switching patterns in the sequence. The LED string of each of the plurality of LED lighting circuits is arranged in a two-dimensional array.

BRIEF DESCRIPTION OF THE DRAWINGS

A more detailed understanding can be had from the following description, given by way of example in conjunction with the accompanying drawings wherein.

DETAILED DESCRIPTION

Figure 1:
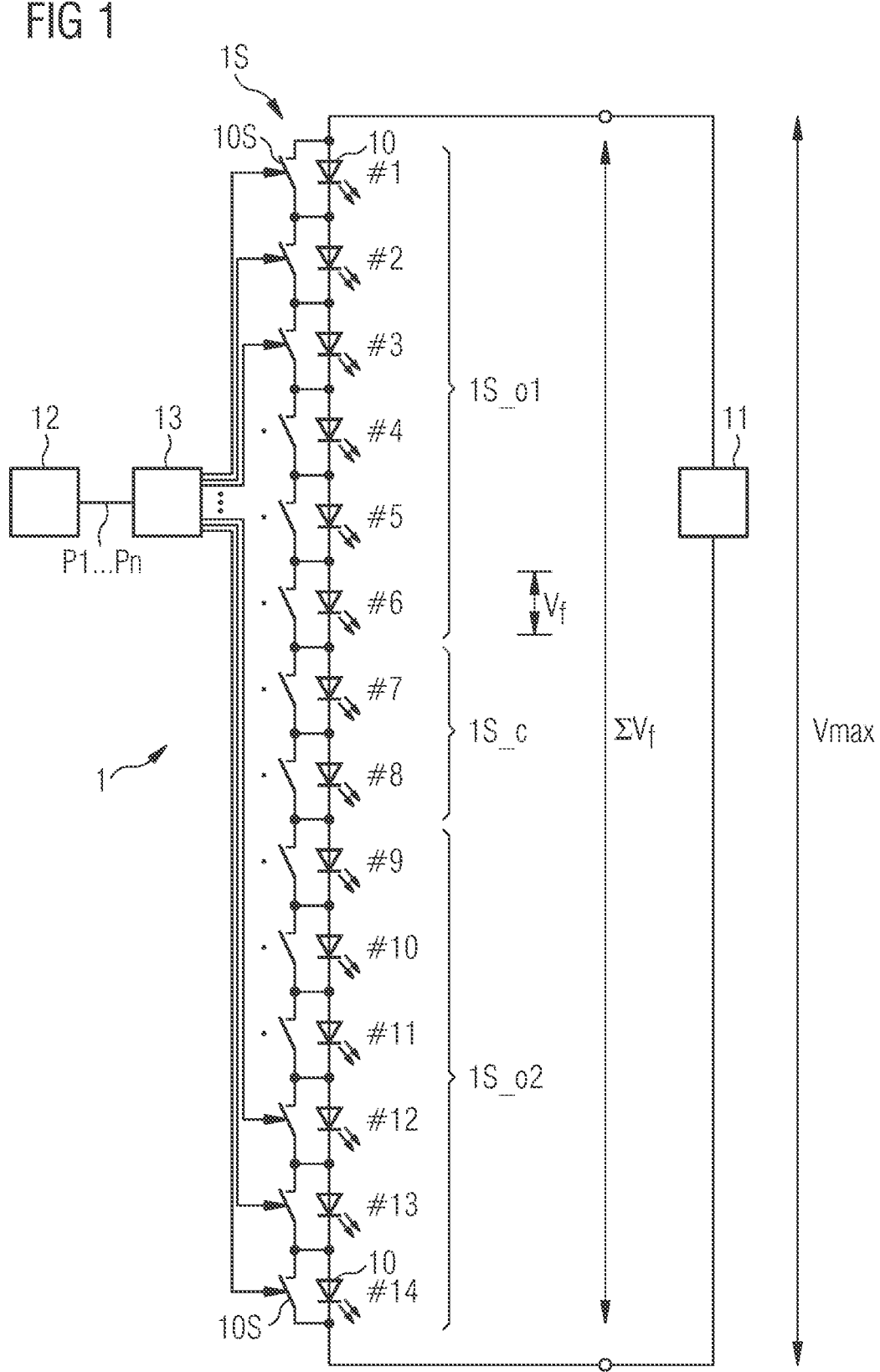
FIG. 1 is a block diagram of an example LED lighting circuit.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Some lighting applications, such as automotive lighting applications, use LED strings for various purposes, such as for an adaptive front beam or a matrix front beam. Due to safety standards, the maximum output voltage of a driver for such a lighting circuit is typically limited to be less than 60 V to vehicle ground, usually with a margin defined by the vehicle manufacturer. In such an example, the maximum output voltage available to an application might be 55 V or even less. In the case of an LED lighting application, this limitation may place a constraint on the number of LEDs that can be included in a string, bearing in mind that the forward voltage of an LED can increase significantly at low temperatures. For example, if the total forward voltage of an LED is normally about 4 V but rises to 4.5 V in cold conditions, the total forward voltage of twelve such LEDs already approaches the manufacturer's limit. If it is desired to use more than this number of LEDs, a second driver may be required. This can add significantly to the overall cost of the lighting application.

Embodiments described herein provide for an LED lighting circuit that includes a power supply that is configured to provide a maximum voltage and an LED string that includes a number of series-connected LEDs. The total forward voltage of the LED string may exceed the maximum voltage of the power supply. The LED lighting circuit may also include a switch arrangement that includes a number of switches, each coupled in parallel with an LED of the LED string. The LED lighting circuit may also include a switching sequencer for providing a sequence of PWM switching patterns such that the total forward voltage of simultaneously active LEDs in a switching pattern does not exceed the maximum voltage of the power supply. A switch controller may be configured to actuate switches of the switch arrangement according to a switching pattern.

Accordingly, embodiments described herein may provide for an LED lighting circuit that enables a greater number of LEDs to be driven by a power supply. In other words, it may be possible for the LED lighting circuit to have LEDs with a total forward voltage that exceeds the capability of its driver. The LEDs may be driven in such a way that the LEDs of the string are never all on at the same time and that the total number of LEDs that are on at any one time does not exceed the maximum voltage of the power supply. Because the LEDs are switched in such a way that the capacity of the driver is never exceeded, the LED string can include any number of LEDs. Further, the LED string can also include LEDs with a higher maximum drive current, for example.

FIG. 1 is a block diagram of an example LED lighting circuit 1. In the example illustrated in FIG. 1, the LED lighting circuit 1 includes an LED string 1S comprising a number of series-connected LEDs 10 (e.g., fourteen LEDs 10 labeled #1-#14 in the illustrated example). Each LED 10 has a forward voltage $V_f$. The LED lighting circuit 1 may further include a power supply 11 configured to provide a maximum voltage $V_{max}$ across the LED string 1S. The power supply 11 may be, for example, a DC-DC converter. The number of LEDs 10 in the string 1S may be such that the total forward voltage $\Sigma V_f$ of the LEDs 10 in the string 1S would exceed the maximum voltage $V_{max}$ of the power supply if the LEDs 10 were all on at the same time. In the example illustrated in FIG. 1, it may be assumed that the power supply 11 is configured to provide a maximum voltage $V_{max}$ corresponding to $10 \cdot V_f$. If all LEDs 10 were on at the same time, their total forward voltage $14 \cdot V_f$ would exceed the maximum voltage $V_{max}$ of the power supply 11.

The two innermost LEDs #7 and #8 may form a central group 1S_c. LEDs #1-#6 may form a first outer LED group 1S_o1, commencing with the string anode. LEDs #9-#14 may form a second outer LED group 1S_o2, terminating with the string cathode.

In the example illustrated in FIG. 1, the LED lighting circuit 1 further includes a number of switches 10S wherein each switch 10S may be electrically coupled in parallel with an LED 10 of the LED string 1S. Because such a switch serves to bypass the LED to which it is electrically coupled in parallel, it may be referred to as a bypass switch. One of ordinary skill in the art will recognize, however, that other embodiments are possible in which certain LEDs are not provided with bypass switches so that these LEDs are always on when connected to the power supply.

A switching sequencer 12 may provide a sequence of switching patterns P1, . . . , P14, which will be explained in more detail below with reference to FIG. 2. The total forward voltage of simultaneously active LEDs 10 in a switching pattern P1, . . . , P4 may not exceed the maximum voltage $V_{max}$ of the power supply 11.

In the example illustrated in FIG. 1, the LED lighting circuit 1 also includes a switch controller 13, which may be configured to actuate selected switches 10S according to a switching pattern P1, . . . , P14 by generating appropriate switch control signals. The switches 10S can be provided in the form of one or more integrated circuits (ICs), each comprising switches and level shifters in a single package that can be mounted with the LEDs on a common carrier or PCB. Such switching ICs may be available commercially, as will be known to the skilled person.

In another example not illustrated in FIG. 1, an LED string may comprise 20 LEDs #1-#20 in series in an anode-to-cathode order. In this example, LEDs #9-#12 may form the central group, LEDs #1-#8 may form the first outer LED group, and LEDs #13-#20 may form the second outer LED group. In embodiments, the central LED group may comprise at most one quarter of the total number of LEDs in the LED string. The LEDs of the central group may always be on or mostly on while the LEDs in the outer groups may be driven so that they are never all simultaneously on.

In some embodiments, the position of a central LED group may be dynamic. For example, a hotspot or the group of LEDs that is always on may shift its position in the string. Such a dynamic hotspot may be useful in an adaptive front lighting application, to direct light into a curve in response to a steering maneuver when turning a corner or to direct light into the curve in a pre-emptive approach.

In embodiments, the hotspot, or group of LEDs that is always on, can be driven with a duty cycle of 100% or with a smaller duty cycle, such as 90%, in order to save energy or to protect the LEDs against overheating.

Figure 2:
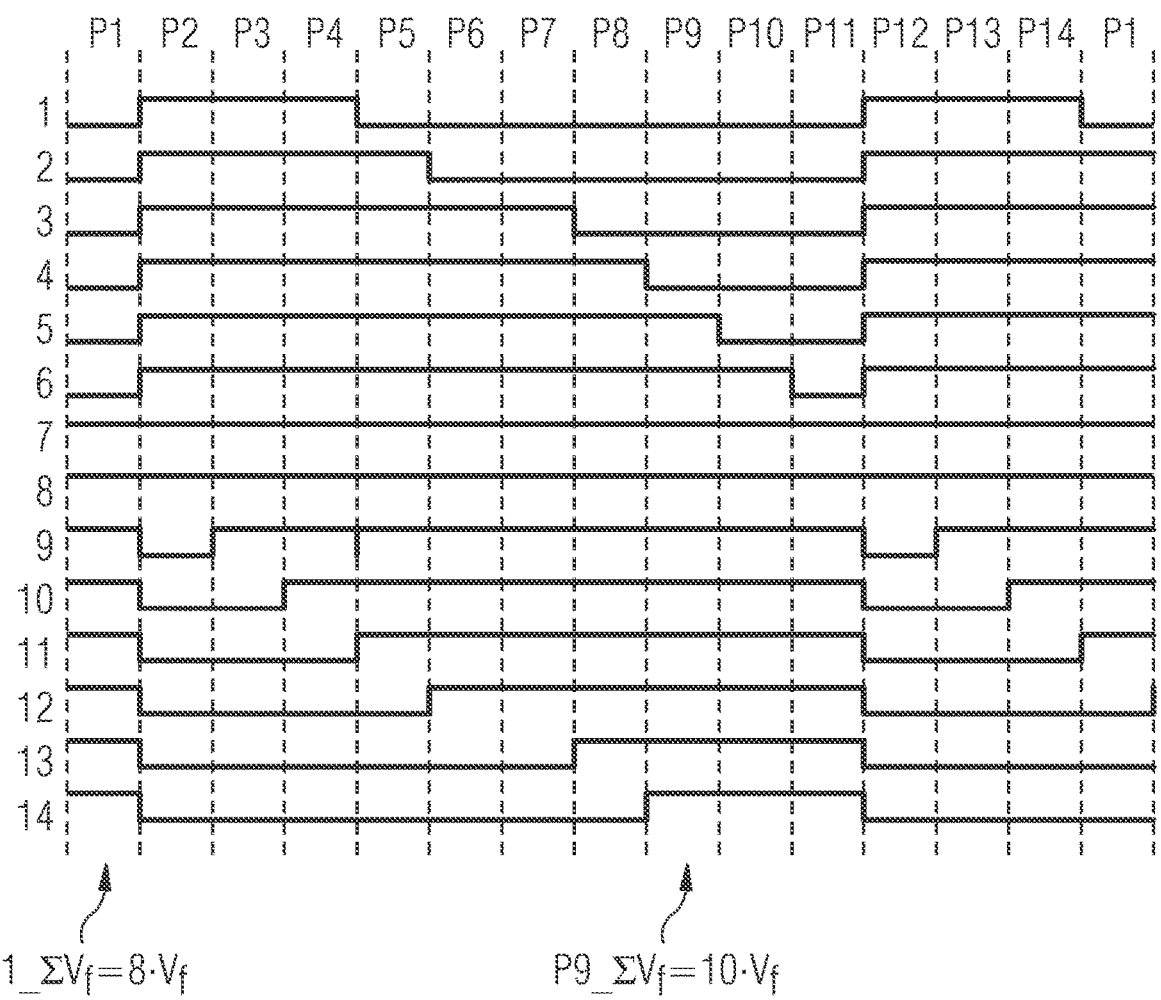
FIG. 2 is a timing diagram showing an example pulse width modulation (PWM) switching sequence.

FIG. 2 is a timing diagram showing an example pulse width modulation (PWM) switching sequence. In the example illustrated in FIG. 2, the sequence comprises a set of fourteen patterns P1-P14, and the sequence can repeat indefinitely. One of ordinary skill in the art will recognize, however, that a sequence can include any number of patterns, and the patterns P1-P14 illustrated in FIG. 2 are only by way of example. Each row of the timing diagram corresponds to an LED of the string in FIG. 1, and indicates how the corresponding LED toggles between an on state and an off state. Each pattern P1, . . . , P14 of the example sequence may define the on/off state of the LEDs in the string. For example, in pattern P1, LEDs #1-#6 are off, and all other LEDs are on. In pattern P3, LEDs #1-#10 are on, and all other LEDs are off.

The timing diagram of FIG. 2 also illustrates how the two innermost LEDs #7 and #8 may always be on. The different duty cycles for the LEDs in the outer LED groups 1S_o1, 1S_o2 are also clearly indicated in FIG. 2. For example, LED #1 and LED #14 may each have a duty cycle of only 30%, while LED #6 and LED #9 may each have a duty cycle of 90%. As a result, the total forward voltage of the active LEDs of the string 1S may never exceed the driver's maximum. For example, the total forward voltage P1_$\Sigma V_f$ for pattern P1 is $8 \cdot V_f$, while the total forward voltage P9_$\Sigma V_f$ for pattern P9 is $10 \cdot V_f$.

In some embodiments, the switching sequencer 12 of FIG. 1 may be configured to compile a sequence of switching patterns in which the duty cycle of an LED of an outer LED group is shorter than the duty cycle of an LED of the central LED group. The LEDs of the outer LED group may all have a duty cycle of 50%, for example, and complementary pairs of LEDs of the outer LED groups may be switched alternately so that only one LED of each such pair is on at any one time. Alternatively, the switching sequencer 12 may be configured to compile a sequence of switching patterns in which the duty cycle of an outermost LED of an outer LED group is shorter than the duty cycle of an innermost LED of that outer LED group. In other words, the duty cycle of an LED may decrease with increasing distance from the string center. In some embodiments, the duty cycle of an outermost LED of an outer LED group may be at most 30%. In other embodiments, the duty cycle of an innermost LED of an outer LED group may be at most 90%. The duty cycle of an LED of the central LED group can be 100%, for example, an LED in the center of the string can be on whenever the string is connected to the power supply.

Figure 3:
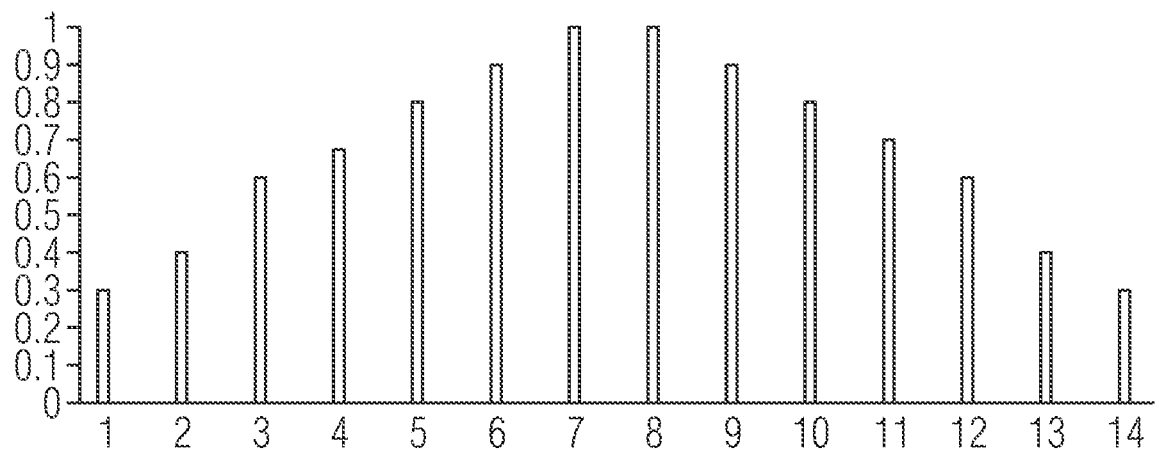
FIG. 3 is an example graph showing the relative light intensity of the LEDs in the string of FIG. 1 when driven using a sequence of FIG. 2.

FIG. 3 is an example graph showing the relative light intensity of the LEDs 10 in the string 10S of FIG. 1 when driven using a sequence of FIG. 2. In the graph of FIG. 3, each column corresponds to an LED of the string 1S of FIG. 1, as indicated by the labels #1-#14. If the intensity of the two central LEDs #7 and #8 is regarded as 1 or 100%, then the relative intensity of the outermost LEDs #1 and #14 may only be 0.3 or 30%.

Figure 4:
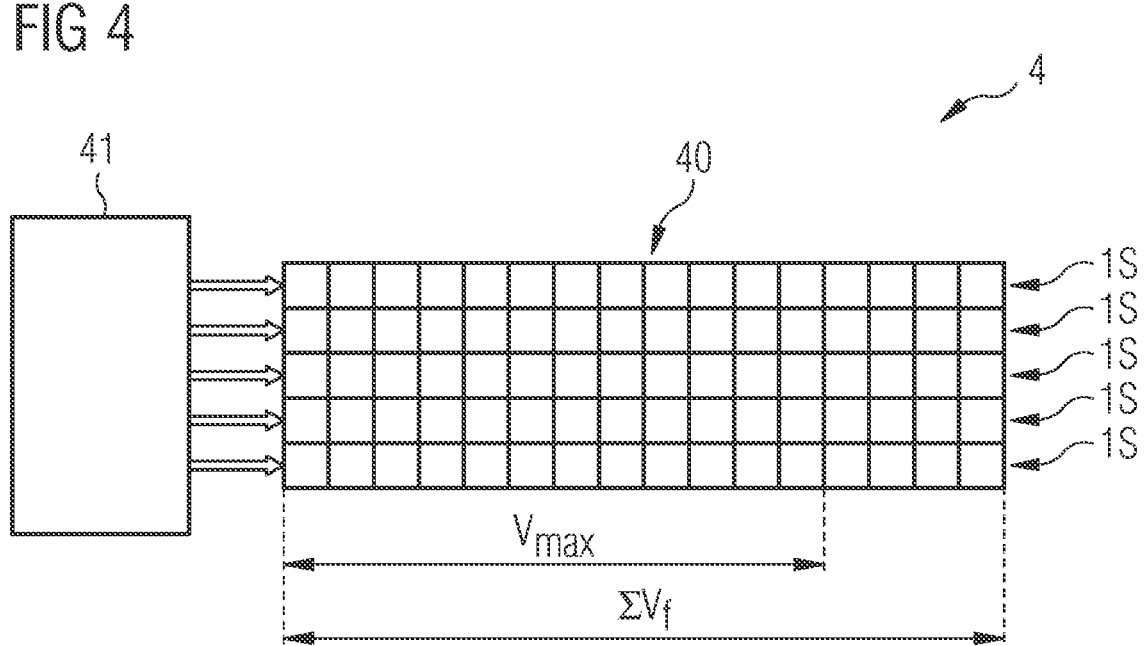
FIG. 4 is a block diagram of an example lighting unit that includes a number of the LED lighting circuits of FIG. 1.

FIG. 4 is a block diagram of an example lighting unit that includes a number of the LED lighting circuits 1 of FIG. 1. In the example illustrated in FIG. 4, five LED strings 1S of the lighting circuits are arranged in a two-dimensional array 40, and each string 1S includes 16 series-connected LEDs (indicated as pixel squares of the array 40). A driver module 41 includes one driver 11 for each LED string 1S. Each driver can deliver a limited voltage $V_{max}$, which may be less than the total forward voltage of a string 1S as indicated in the drawing. The lighting unit 4 may be advantageous in that the array size can be larger (i.e., there may be more image pixels in the array), as long as the total number of LEDs in a string that are on at any one time does not exceed the maximum number that can be driven by the corresponding power supply.

The driver module 41 can include a single switching sequencer similar to that described in FIG. 1, but it can be configured to provide switching pattern sequences for each of the LED strings 1S. The driver module 41 may also include a switch controller that may generate control signals for the switches of the LED strings 1S according to the switching patterns.

The increased image size with unchanged driver size may be an important aspect for compact applications, such as automotive signaling lamps. For example, modern vehicles are being equipped with lighting units than can convey information to the vehicle owner and/or to other traffic participants. The increased image size can improve the quality of the information that can be shown. In some embodiments, the lighting unit may be an automotive adaptive front beam, an automotive daytime running light, etc., or a non-automotive application, such as an interior lighting application or a dynamic spot lighting application in which dynamic control of the LEDs is desired.

In some embodiments, the lighting unit includes multiple LED lighting circuits, and the LED strings may be arranged in a two-dimensional array. Such an embodiments can be used as a matrix light in which each LED serves as a pixel or emitter.

Figure 5:
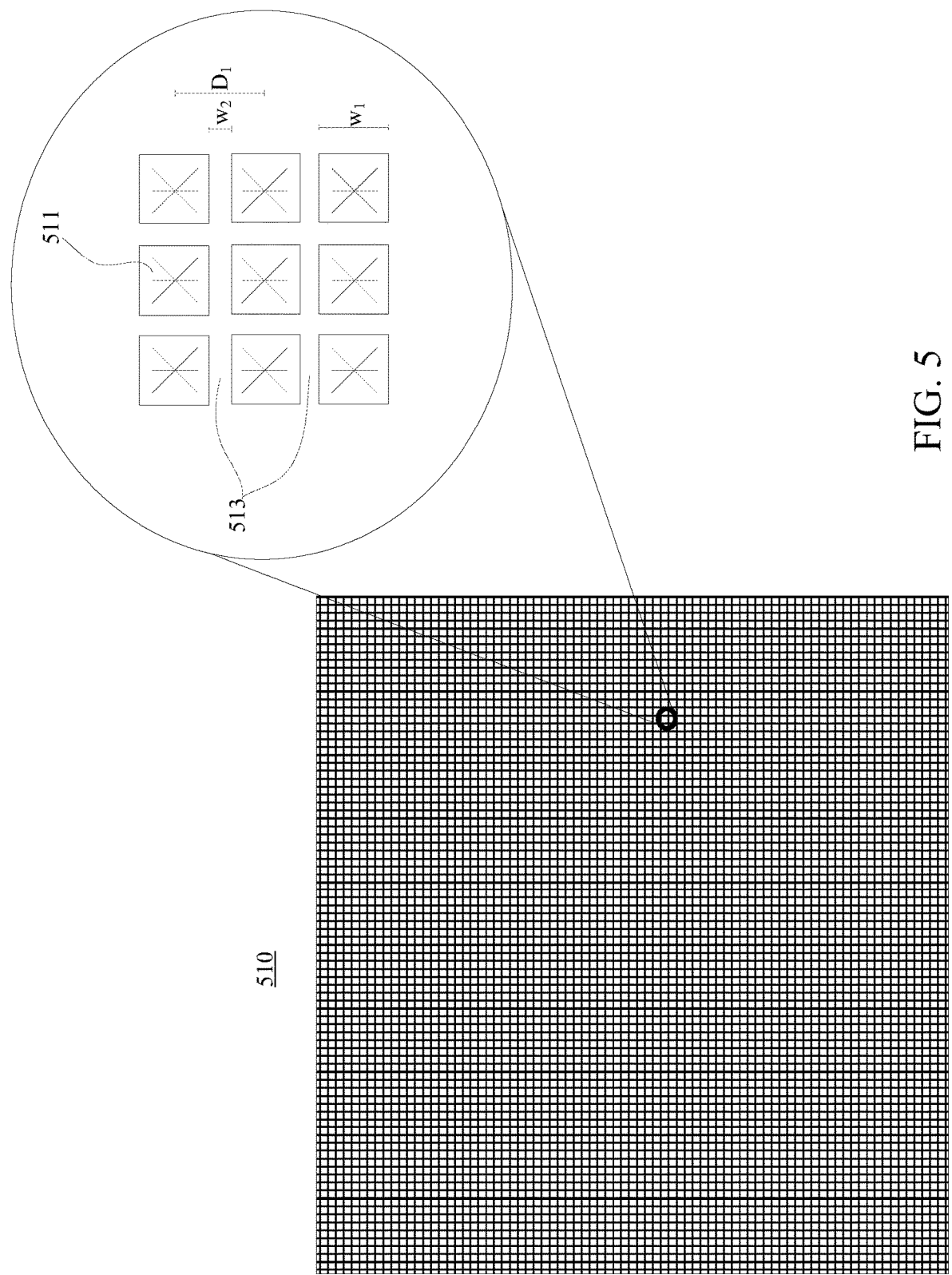
FIG. 5 is a top view of an example LED array that may be used in LED lighting circuits, such as the LED lighting circuits of FIGS. 1 and 4.

FIG. 5 is a top view of an example LED array 510 that may be used in LED lighting circuits, such as the LED lighting circuits of FIGS. 1 and 4. In the example illustrated in FIG. 5, the LED array 510 is an array or matrix of emitters 511. LED arrays may be used for any application, such as those requiring precision control of LED array emitters. Emitters 511 in the LED array 510 may be individually addressable or may be addressable in groups/subsets.

An exploded view of a 3×3 portion of the LED array 510 is also shown in FIG. 5. As shown in the 3×3 portion exploded view, the LED array 510 may include emitters 511 that each have a width $w_1$. In embodiments, the width $w_1$ may be approximately 100 μm or less (e.g., 40 μm). Lanes 513 between the emitters 511 may be a width, $w_2$, wide. In embodiments, the width $w_2$ may be approximately 20 μm or less (e.g., 5 μm). The lanes 513 may provide an air gap between adjacent emitters or may contain other material. A distance di from the center of one emitter 511 to the center of an adjacent emitter 511 may be approximately 120 μm or less (e.g., 45 μm). It will be understood that the widths and distances provided herein are examples only and that actual widths and/or dimensions may vary.

It will be understood that, although rectangular emitters arranged in a symmetric matrix are shown in FIG. 5, emitters of any shape and arrangement may be applied to the embodiments described herein. For example, the LED array 510 of FIG. 5 may include over 20,000 emitters in any applicable arrangement, such as a 200×100 matrix, a symmetric matrix, a non-symmetric matrix, or the like. It will also be understood that multiple sets of emitters, matrixes, and/or boards may be arranged in any applicable format to implement the embodiments described herein.

As mentioned above, LED arrays, such as the LED array 510, may include up to 20,000 or more emitters. Such arrays may have a surface area of 90 mm$^2$ or greater and may require significant power to power them, such as 60 watts or more. An LED array such as this may be referred to as a micro LED array or simply a micro LED. A micro LED may include an array of individual emitters provided on a substrate or may be a single silicon wafer or die divided into segments that form the emitters. The latter type of micro LED may be referred to as a monolithic LED.

Figure 6:
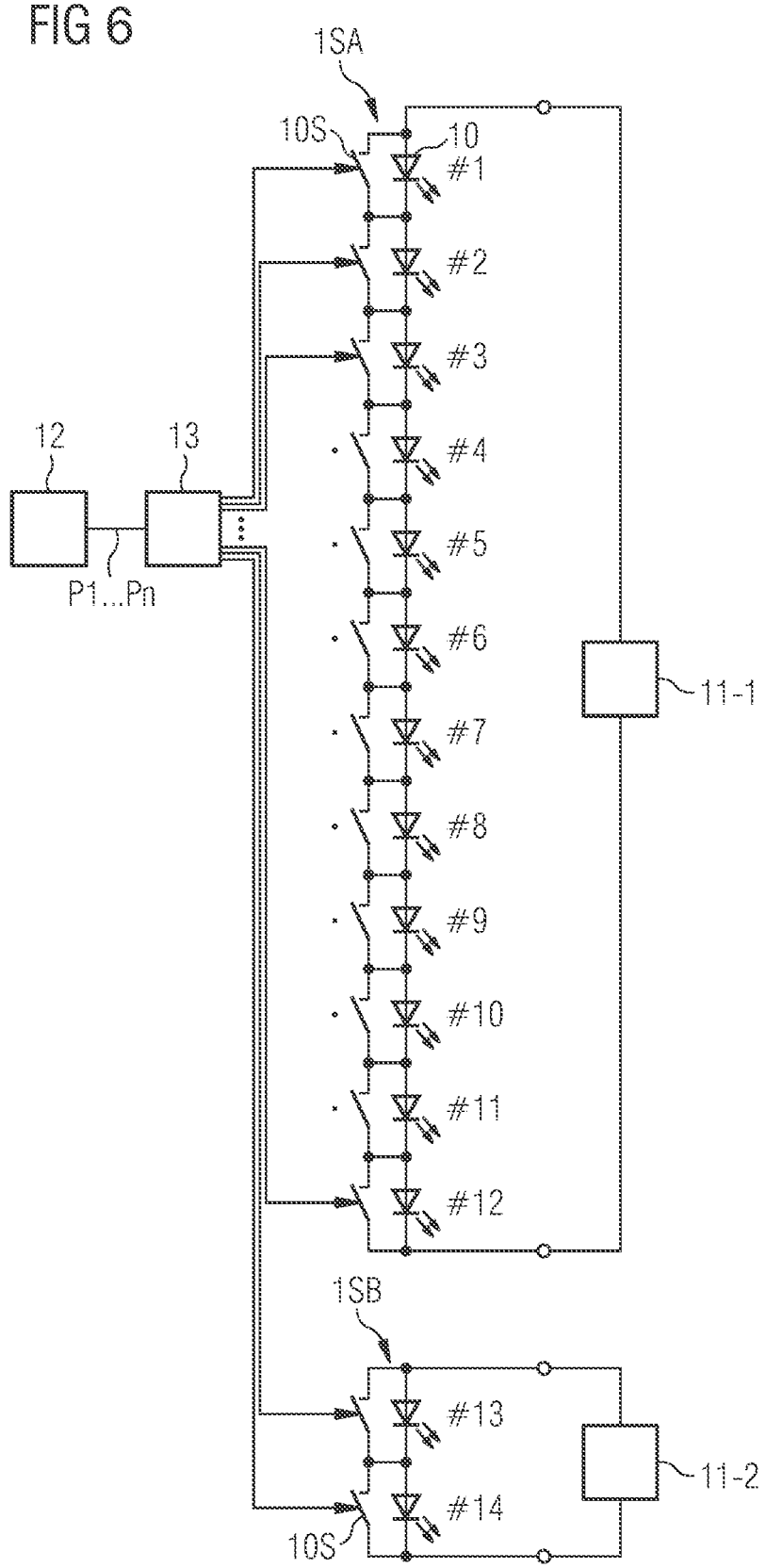
FIG. 6 is a diagram of an LED lighting circuit that does not include elements of the embodiments of FIGS. 1-4 and that requires that all LEDs of a string be turned on simultaneously.

FIG. 6 is a diagram of an LED lighting circuit that does not include elements of the embodiments of FIGS. 1-4 and that requires that all LEDs of a string to be turned on simultaneously. As explained above, the usual way of controlling a series-connected string of LEDs generally includes a mode in which all LEDs of the string are simultaneously on. However, the maximum voltage of a driver may not exceed a threshold defined by the manufacturer. In an automotive application that must also be able to function in very cold conditions, the total forward voltages of twelve 4 V LEDs already approaches the upper limit of a 60 V supply (after deduction of the manufacturer's safety margin). Therefore, in order to drive the same number of LEDs as the LED lighting circuit of FIG. 1, the LED lighting circuit illustrated in FIG. 6 requires two drivers 11A, 11B, each of which may drive a string segment. Here, the circuit uses a first driver 11A for a first string 1SA of twelve LEDs #1-#12 and a second driver 11B for a second string 1SB with the two additional LEDs #13 and #14. The elements of the switching circuitry are connected accordingly, for example with an additional IC for the switches of LEDs #13 and #14.

Figure 7:
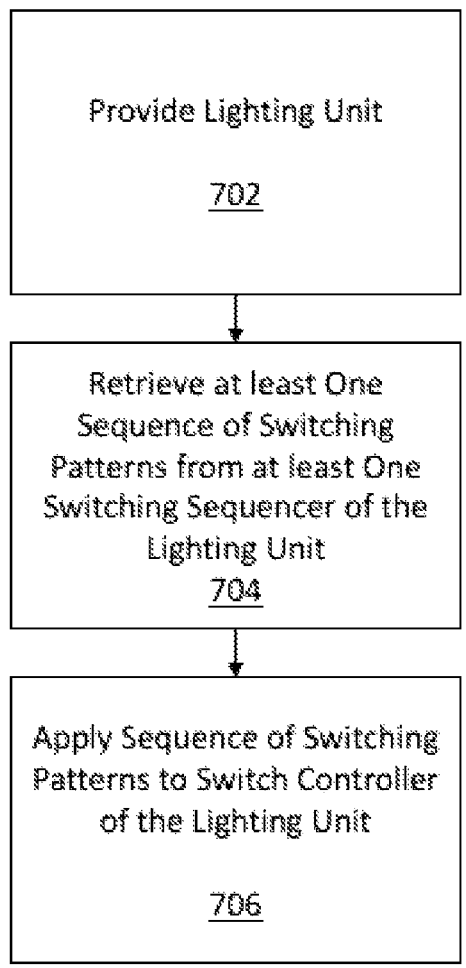
FIG. 7 is a flow diagram of an example method of operating an LED lighting circuit.

FIG. 7 is a flow diagram 700 of an example method of operating a lighting unit, such as the lighting unit of FIG. 4. In the example illustrated in FIG. 7, a lighting unit may be provided (702). The lighting unit may be any of the lighting units described herein. For example, the lighting unit may include at least one power supply configured to provide a maximum voltage, a two-dimensional matrix of emitters, at least one group of the two-dimensional emitters having a total forward voltage that exceeds the maximum voltage of the at least one power supply, a plurality of switches, each of the plurality of switches being coupled in parallel with a respective one of the emitters, at least one switching sequencer, and at least one switch controller.

The method may also include retrieving at least one sequence of switching patterns from the at least one switching sequencer (704). In embodiments, the at least one sequence of switching patterns is such that a total forward voltage of simultaneously active LEDs in each switching pattern does not exceed the maximum voltage of the at least one power supply.

The method may also include applying the sequence of switching patterns to the switch controller (706). In embodiments, the switch controller may actuate switches according to each of the switching patterns in the sequence.

Figure 8:
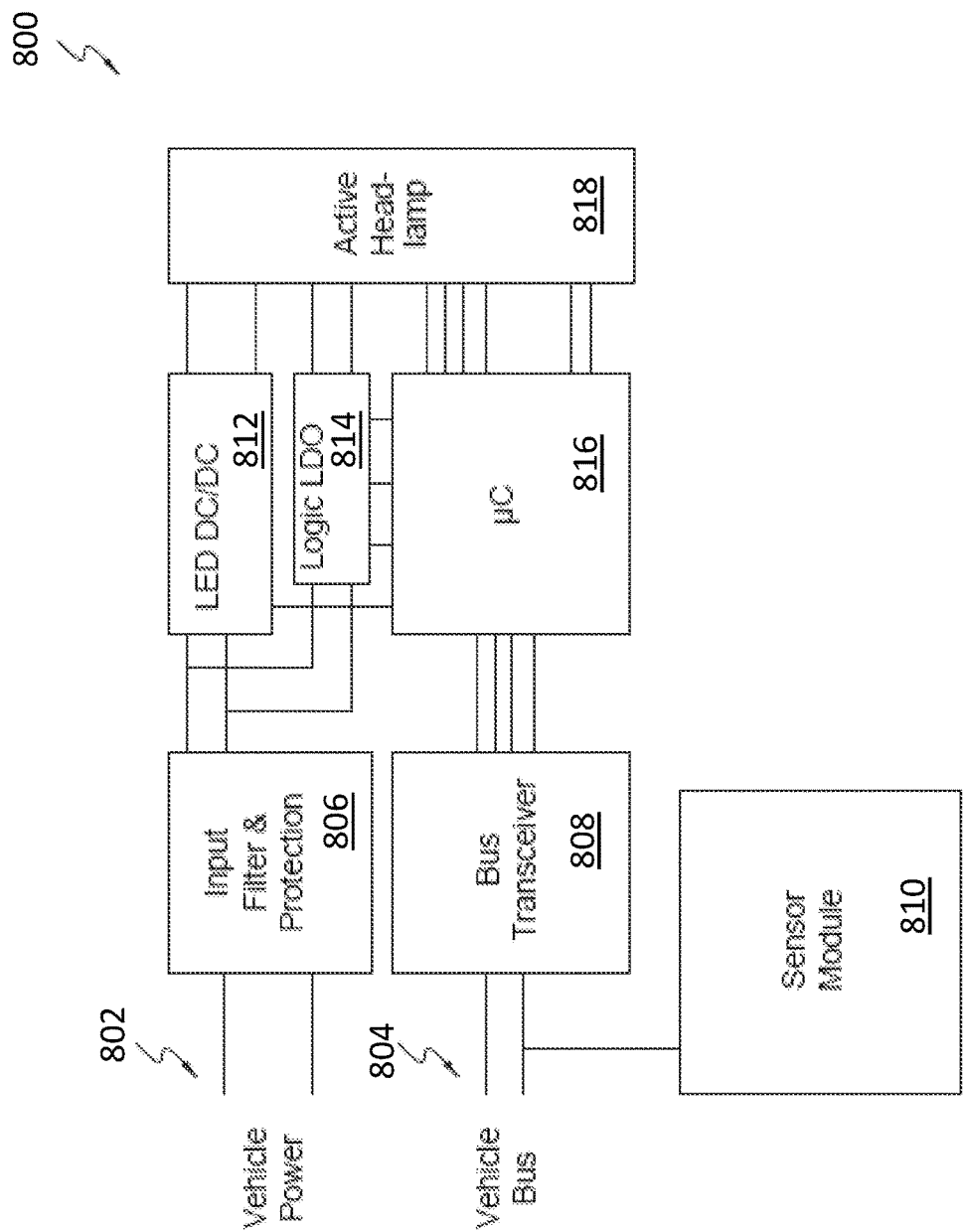
FIG. 8 is a diagram of an example vehicle headlamp system.

FIG. 8 is a diagram of an example vehicle headlamp system 800 that may incorporate one or more of the embodiments and examples described herein. The example vehicle headlamp system 800 illustrated in FIG. 8 includes power lines 802, a data bus 804, an input filter and protection module 806, a bus transceiver 808, a sensor module 810, an LED direct current to direct current (DC/DC) module 812, a logic low-dropout (LDO) module 814, a micro-controller 816 and an active head lamp 818. In embodiments, the active head lamp 818 may be a signal lamp, which may, potentially in combination with other components of the vehicle headlamp system 800 and/or automobile components external to the vehicle headlamp system 800, be configured to implement multiple lighting functions at the same time, or at different times, and may be used, in some embodiments, to ensure that various safety regulations can be met.

The power lines 802 may have inputs that receive power from a vehicle, and the data bus 804 may have inputs/outputs over which data may be exchanged between the vehicle and the vehicle headlamp system 800. For example, the vehicle headlamp system 800 may receive instructions from other locations in the vehicle, such as instructions to turn on turn signaling or turn on headlamps, and may send feedback to other locations in the vehicle if desired. In embodiments, the active headlamp 818 may include one or more LED lighting circuit or lighting unit, as described above with respect to FIGS. 1-4.

The sensor module 810 may be communicatively coupled to the data bus 804 and may provide additional data to the vehicle headlamp system 800 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 800. In FIG. 8, the headlamp controller may be a micro-controller, such as micro-controller (pc) 816. The micro-controller 816 may be communicatively coupled to the data bus 804.

The input filter and protection module 806 may be electrically coupled to the power lines 802 and may, for example, support various filters to reduce conducted emissions and provide power immunity. Additionally, the input filter and protection module 806 may provide electrostatic discharge (ESD) protection, load-dump protection, alternator field decay protection, and/or reverse polarity protection.

The LED DC/DC module 812 may be coupled between the input filter and protection module 806 and the active headlamp 818 to receive filtered power and provide a drive current to power LEDs in the LED array in the active headlamp 718. The LED DC/DC module 812 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 814 may be coupled to the input filter and protection module 806 to receive the filtered power. The logic LDO module 814 may also be coupled to the micro-controller 816 and the active headlamp 818 to provide power to the micro-controller 816 and/or electronics in the active headlamp 818, such as CMOS logic.

The bus transceiver 808 may have, for example, a universal asynchronous receiver transmitter (UART) or serial peripheral interface (SPI) interface and may be coupled to the micro-controller 816. The micro-controller 816 may translate vehicle input based on, or including, data from the sensor module 810. The translated vehicle input may include a video signal that is transferrable to an image buffer in the active headlamp 818. In addition, the micro-controller 816 may load default image frames and test for open/short pixels during startup. In embodiments, an SPI interface may load an image buffer in CMOS. Image frames may be full frame, differential or partial frames. Other features of micro-controller 816 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 9:
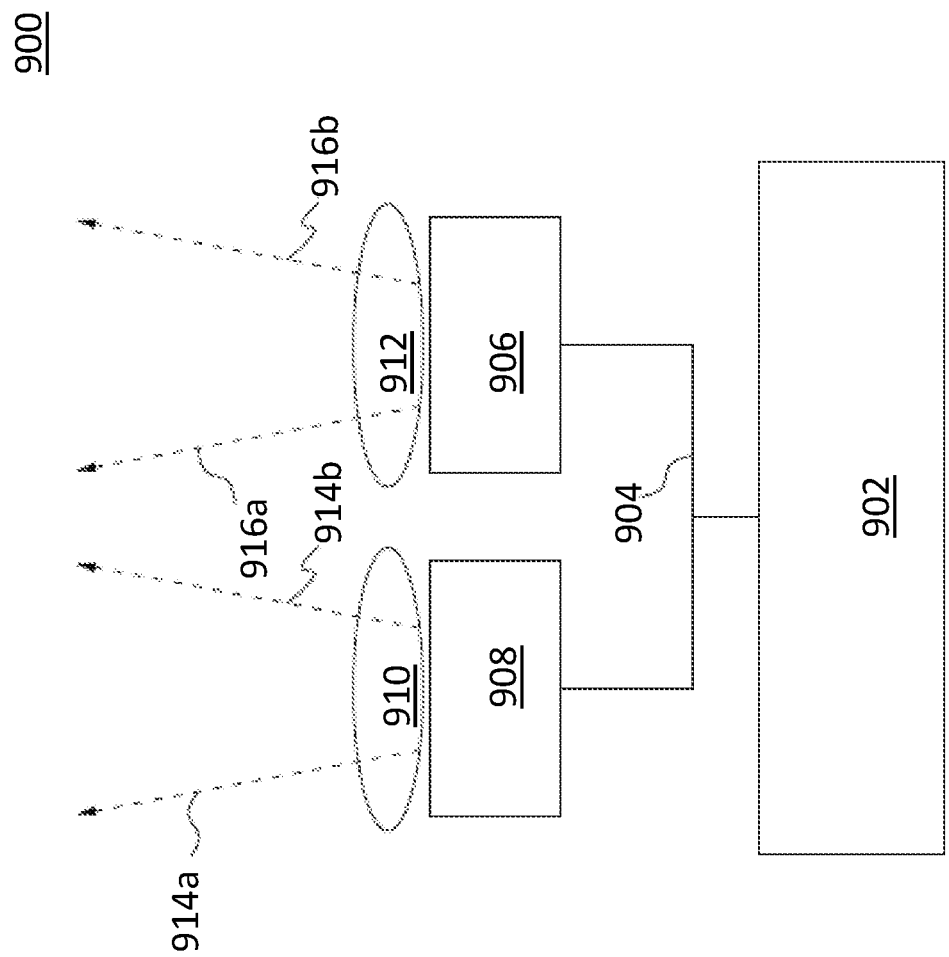
FIG. 9 is a diagram of another example vehicle headlamp system.

FIG. 9 is a diagram of another example vehicle headlamp system 900. The example vehicle headlamp system 900 illustrated in FIG. 9 includes an application platform 902, two LED lighting systems 906 and 908, and secondary optics 910 and 912.

The LED lighting system 908 may emit light beams 914 (shown between arrows 914a and 914b in FIG. 9). The LED lighting system 906 may emit light beams 916 (shown between arrows 916a and 916b in FIG. 9). In the embodiment shown in FIG. 9, a secondary optic 910 is adjacent the LED lighting system 908, and the light emitted from the LED lighting system 908 passes through the secondary optic 910. Similarly, a secondary optic 912 is adjacent the LED lighting system 906, and the light emitted from the LED lighting system 906 passes through the secondary optic 912. In alternative embodiments, no secondary optics 910/912 are provided in the vehicle headlamp system.

The application platform 902 may provide power and/or data to the LED lighting systems 906 and/or 908 via lines 904, which may include one or more or a portion of the power lines 802 and the data bus 804 of FIG. 8. One or more sensors (which may be the sensors in the vehicle headlamp system 900 or other additional sensors) may be internal or external to the housing of the application platform 902. Alternatively, or in addition, as shown in the example vehicle headlamp system 800 of FIG. 8, each LED lighting system 908 and 906 may include its own sensor module, connectivity and control module, power module, and/or LED array.

In embodiments, the vehicle headlamp system 900 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 906 and 908 may be sensors (e.g., similar to sensors in the sensor module 810 of FIG. 8) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A lighting unit comprising:
    a plurality of LED lighting circuits each comprising:
        a power supply configured to provide a maximum voltage;
        an LED string comprising a plurality of series-connected emitters having a total forward voltage that exceeds the maximum voltage of the power supply;
        a plurality of switches, each of the plurality of switches being coupled in parallel with a respective LED of the LED string;
        a switching sequencer configured to provide a sequence of switching patterns such that a total forward voltage of simultaneously active LEDs in each switching pattern does not exceed the maximum voltage of the power supply; and
        a switch controller configured to actuate switches according to each of the switching patterns in the sequence,
    the LED string of each of the plurality of LED lighting circuits being arranged in a two-dimensional array.

2. The lighting unit according to claim 1, wherein each of the plurality of LED lighting circuits comprises a respective driver, the respective driver comprising the power supply, the switching sequencer and the switch controller, the power supply being configured to provide a maximum voltage across the corresponding led lighting circuit, the switching sequencer being configured to provide a sequence of switching patterns for the corresponding LED lighting circuit, and the switch controller being configured to actuate the switches of the corresponding LED lighting circuit based on the provided sequence of switching patterns.

3. The lighting unit according to claim 1, wherein: the LED string for each of the plurality of series-connected LEDs comprises a central LED group between two outer LED groups, and the outer LED groups are of equal length.

4. The lighting unit according to claim 3, wherein: one of the outer LED groups commences with an anode of the LED string, and the other one of the outer LED group terminates with a cathode of the LED string.

5. The lighting unit according to claim 3, wherein the central LED group comprises at most 25% of the total number of LEDs in the LED string.

6. The lighting unit according to claim 3, wherein the switching sequencer is configured to compile a sequence of switching patterns in which the duty cycle of an LED of an outer LED group is shorter than the duty cycle of an LED of the central LED group.

7. The lighting unit according to claim 3, wherein the switching sequencer is configured to compile a sequence of switching patterns in which the duty cycle of an outermost LED of an outer LED group is shorter than the duty cycle of an innermost LED of that outer LED group.

8. A method of operating a lighting unit, the method comprising:
    providing the lighting unit, the lighting unit comprising:
        at least one power supply configured to provide a maximum voltage,
        a two-dimensional matrix of emitters, at least one group of the two-dimensional emitters having a total forward voltage that exceeds the maximum voltage of the at least one power supply,
        a plurality of switches, each of the plurality of switches being coupled in parallel with a respective one of the emitters,
        at least one switching sequencer, and
        at least one switch controller;
    retrieving at least one sequence of switching patterns from the at least one switching sequencer, the at least one sequence being such that a total forward voltage of simultaneously active LEDs in each switching pattern does not exceed the maximum voltage of the at least one power supply; and
    applying the sequence of switching patterns to the switch controller to actuate switches according to each of the switching patterns in the sequence.

9. The method according to claim 8, wherein: the LED string for each of the plurality of series-connected LEDs comprises a central LED group between two outer LED groups, and the switching is such that a duty cycle of an LED of an outer LED group is shorter than the duty cycle of an LED of the central LED group.

10. The method according to claim 9, wherein the duty cycle of an outermost LED of an outer LED group is shorter than the duty cycle of an innermost LED of that outer LED group.

11. The method according to claim 9, wherein the duty cycle of an outermost LED of an outer LED group is at most 30%.

12. The method according to claim 9, wherein the duty cycle of an innermost LED of an outer LED group is at least 60%.

13. The method according to claim 8, wherein the duty cycle of an ED decreases with increasing distance from the center of the LED string.

14. A lighting unit comprising:
    a power supply configured to provide a maximum voltage;
    a two-dimensional matrix of emitters comprising a plurality of series-connected emitters having a total forward voltage that exceeds the maximum voltage of the power supply;
    a plurality of switches, each of the plurality of switches being coupled in parallel with a respective emitter or a respective group of emitters of the two-dimensional matrix of emitters;
    a switching sequencer configured to provide a sequence of switching patterns such that a total forward voltage of simultaneously active emitters in each switching pattern does not exceed the maximum voltage of the power supply; and
    a switch controller configured to actuate switches according to each of the switching patterns in the sequence.

15. The lighting unit according to claim 14, wherein the lighting unit further comprises a driver, and the driver comprises a single switching sequencer for all of the emitters in the two-dimensional matrix of emitters, and a single switch controller.

16. The lighting unit according to claim 14, wherein the lighting unit further comprises one driver for each of a plurality of series strings of emitters in the two-dimensional matrix of emitters, and each driver comprises a switching sequencer and a switch controller for the corresponding series string of emitters.

17. The lighting unit according to claim 14, wherein: the emitters in the two-dimensional matrix of emitters comprise at least one central emitter group between two outer emitter groups, and the outer emitter groups are of equal length.

18. The lighting unit according to claim 17, wherein the switching sequencer is configured to compile a sequence of switching patterns in which a duty cycle of an emitter of an outer emitter group is shorter than the duty cycle of an emitter of the at least one central emitter group.

19. The lighting unit according to claim 17, wherein the switching sequencer is configured to compile a sequence of switching patterns in which the duty cycle of an outermost emitter of an outer emitter group is shorter than the duty cycle of an innermost emitter of that outer emitter group.

20. The lighting unit according to claim 17, wherein at least one of the duty cycle of an outermost emitter of an outer emitter group is at most 30% or the duty cycle of an innermost LED of an outer LED group is at least 60%.

\* \* \* \* \*